July 13, 1943.  W. B. JOHNSON  2,323,913
FOLDING PEDAL
Filed Feb. 27, 1942  2 Sheets-Sheet 1
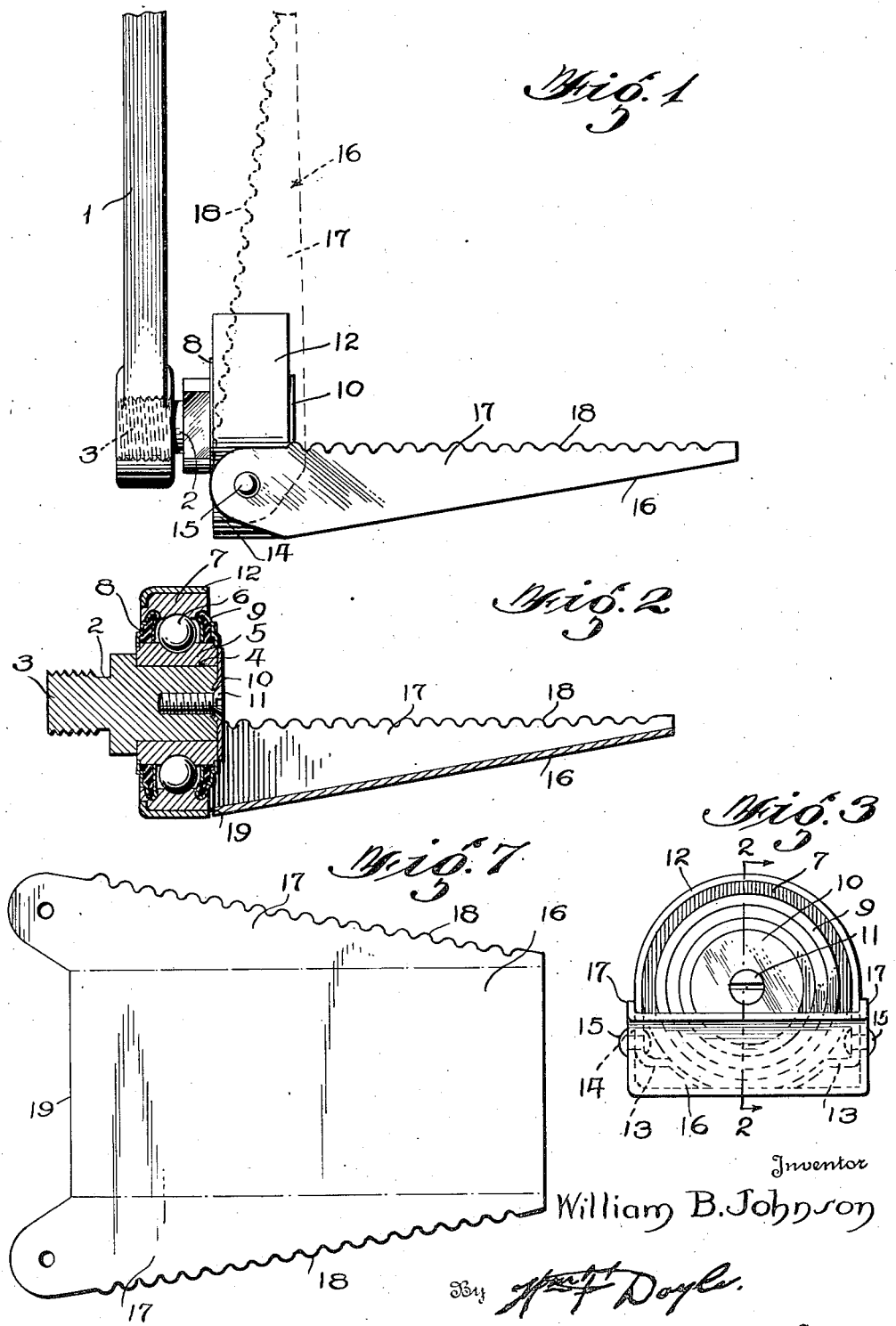
Inventor
William B. Johnson
By Doyle
Attorney July 13, 1943.   W. B. JOHNSON   2,323,913
FOLDING PEDAL
Filed Feb. 27, 1942   2 Sheets-Sheet 2
Fig. 4
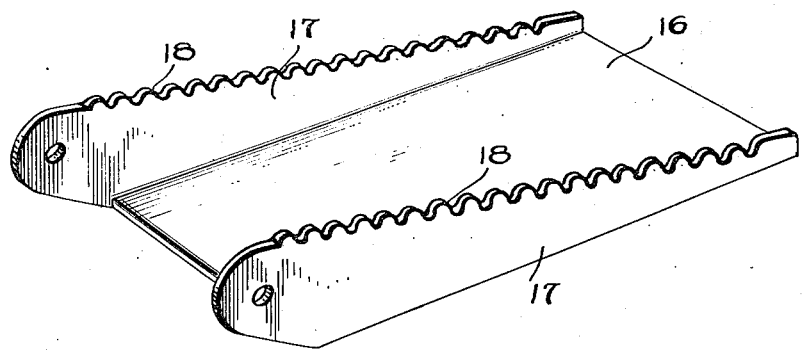
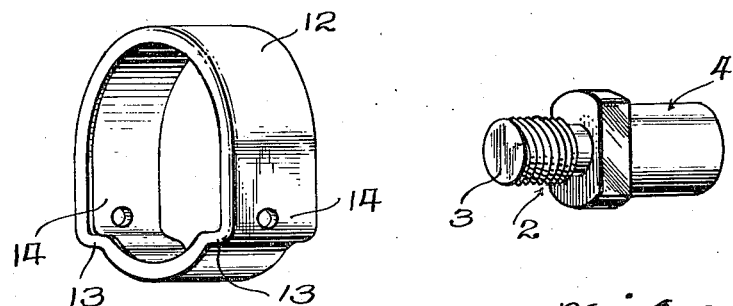
Fig. 5   Fig. 6
Inventor
William B. Johnson
By Wm. F. Doyle
Attorney Patented July 13, 1943

2,323,913

UNITED STATES PATENT OFFICE 2,323,913

FOLDING PEDAL

William B. Johnson, United States Army,
Baltimore, Md.

Application February 27, 1942, Serial No. 432,588

9 Claims. (Cl. 74—594.7)

(Granted under the act of March 3, 1883, as amended April 30, 1928; 370 O. G. 757)

The invention described herein, if patented, may be manufactured and used by or for the Government for governmental purposes, without the payment to me of any royalty thereon.

This invention relates to pedals and more specifically to a pedal adapted for use on a motor cycle, a bicycle, or the like, wherein it is desired to have the pedal extend out from the crank arm, to which it is attached, only while in use, namely, while motor cycle is being cranked, or bicycle is being propelled when riding.

While this improved pedal has general utility, it is in many ways of special value to the Army, and in some particulars was designed to meet War Department purposes and requirements.

An object of this invention, as indicated above, is to provide a pedal, that is, with a single exception, constructed entirely of stamped metal and a stock roller bearing. The spindle on which the parts are mounted requires a minimum of machine work, threaded and tapped, which can be performed by those having very little knowledge of machine work.

Another object is to provide a pedal requiring a minimum amount of metal, and, at the same time, provide one of the required sturdy construction to meet the rough usage to which it is subjected, for instance, when thrusting down thereon with the foot in starting a motor cycle, when coming in contact with curbs or other obstructions, by dragging on the ground when making short turns, and otherwise.

A further object is to provide a pedal that does not include the use of rubber, it being a strategic substance.

Another object is to provide a pedal that will fold closely up against the crank arm, thus reducing materially the lateral space required for a motor cycle at the level of its pedals, approximately 8 or 10 inches, which is vital when stacking the machine into the smallest possible space for emergency transportation purposes, or the like.

A further object is to provide a folding pedal for the purposes above referred to and also one in which the elements of the pedal are so assembled as to cause the folding foot piece to remain byg ravity in its extended position, the upper edges of the sides of the foot piece on which the foot rests are automatically presented in position to receive the foot.

Simplicity, durability, and economic construction are the fundamental characteristics of this improved pedal, not only in its original construction, but in its maintenance.

The above and other objects of this invention will appear in the following description and be finally pointed out in the claims.

A preferred embodiment of the invention is shown, but it will be understood that slight changes in form and minor details of construction may be resorted to without departing from the spirit of the invention or fall beyond the scope of the claims.

Similar numerals indicate corresponding parts in all the figures of the drawings in which:

Fig. 1 is an elevation showing my improved pedal and a fragment of the crank arm of a motor cycle, the foot piece being extended and parts being shown in dotted positions.

Fig. 2 is a vertical, longitudinal section of the pedal assembly, the parts being shown as in Fig. 1.

Fig. 3 is an end view of the pedal as shown in Fig. 1.

Fig. 4 is a perspective of the foot piece of the pedal.

Fig. 5 is a similar view of the bearing cage.

Fig. 6 is a similar view of the spindle.

Fig. 7 is a view of the foot piece blank.

Referring to the drawings by numerals: 1 indicates the crank arm of a motor cycle of the usual construction, in the end of which is mounted the spindle 2 of my improved folding pedal by threading shank 3 thereof into the crank in the usual manner.

The spindle is provided with a seat 4 on which is mounted the assembled ball bearing comprising the inner ball race 5, the balls 6, and the outer ball race 7. Inner and outer dust washers 8 and 9, respectively, are provided, and the bearing is secured on the spindle by washer 10 through which retaining screw 11 passes and is threaded into the end of the spindle.

A bearing cage 12 is securely mounted on the bearing, and is provided below the axis of the bearing with outwardly bent portions 13—13, adapted to provide vertical surfaces 14—14 on opposite sides of the cage and for the reception of pivoted bearings, preferably in the form of rivets 15—15, on which the folding foot piece 16 is mounted.

The folding foot piece 16 is tapered at its sides 17—17 from its inner or pivoted end toward its outer portion, thus avoiding the use of more metal than is required to fully meet the strains applied to the pedal and also to elevate the outer portion of the pedal, giving it more clearance, and cause it to pass over obstacles and permit a greater tilting of the vehicle in turning.

The folding foot piece is provided along its upper side edges with serrations 18 to retain the foot on the pedal. The construction and formation of said foot piece further provides for dispensing with the use of rubber, permits of practically the entire collapsing of the pedal assembly, there being provided space between the side edges, into which the bearing and cage are received within the dimension of the foot piece when folded, with the result that the least possible amount of projection of the parts of the pedal beyond the crank arm is provided.

A further and important advantage of the structure here shown is in the fact that the folding foot piece will remain by gravity in the position to receive the foot. This is accomplished in the manner that will be observed by an examination of the drawings wherein the entire folding foot piece is suspended on the bearing cage below the axis of the spindle and bearing, and is, therefore, well below the center of gravity, and as a result, when the foot piece is swung into its extended position, it will automatically turn on the bearing to assume the position to receive the foot and any vibration of the machine will not cause it to permanently leave said position. Should an operator decide to mount the machine and operator the pedal, it is only necessary to swing the free end of the foot piece outwardly, when it will immediately assume a position for the reception of the foot, regardless of the folded position from which the foot piece was swung or extended. Should the foot piece swing, when folded into a position with its outer end extending beneath the bearing, said extension will readily yield to any obstruction with which it may come into contact.

The foot piece is of U-shape in cross section, and is provided with an inner edge 19 adapted to abut against the lowered edge of the bearing cage to limit the downward swing of the foot piece. A slight frictional contact between the sides 17—17 of the foot piece and the surfaces 14—14 of the bearing cage, will assist in maintaining the foot piece in its folded position.

The operation of the pedal is obvious, in view of the above, and no further description will be made except to state that the improved pedal herein shown is the result of mature and careful consideration by an Army Officer who is an expert in motor cycle operation and requirements for Army purposes, it has been carefully considered as to its military value and is not a device depending entirely on theory, but is a practical construction adapted to meet specific conditions.

I claim:

1. The combination with a crank arm of a folding pedal comprising, a spindle mounted in the crank arm, a separate ball bearing mounted on the spindle, a foot piece supporting cage having vertically arranged offset portions mounted on the ball bearing, a washer monuted on a spindle adapted to secure the parts in place and a folding foot piece pivotally mounted on the cage adapted to rest against said washer in its upper folded position and against said cage in its lower extended position, as and for the purpose specified.

2. The combination with a crank arm of a folding pedal comprising, a stub spindle having a threaded shank adapted to be mounted in the crank arm and a ball bearing seat, a separate ball bearing removably mounted on said seat, a cage removably mounted on the ball bearing, adapted to support a folding foot piece, a washer mounted on the spindle adapted to secure the parts in place and a foot piece pivotally mounted on the cage adapted when folded or in its normal position to rest against the outer faces of the washer and cage respectively.

3. The combination with a crank arm of a folding pedal comprising, a stub spindle having a threaded shank adapted to be mounted in the crank arm and a ball bearing seat, a ball bearing removably mounted on the seat, a washer secured to the end of the spindle adapted to secure the ball bearing in place, a cage mounted on the ball bearing and a folding foot piece mounted on the cage adapted to swing upwardly into folded position against the outer face of said washer and down into contact with the outer face of the bearing and cage.

4. The combination with a crank arm of a folding pedal comprising, a stub spindle having a threaded shank adapted to be mounted in the crank arm and a ball bearing seat, a ball bearing mounted on the seat, a ball bearing cage mounted on the bearing having outwardly bent portions on opposite sides adapted to form flat surfaces having aligning bearing trunnions out of line and at right angles to the axis of the bearing, and a folding foot piece pivotally mounted at its inner end on said trunnions adapted to fold in parallelism with the crank arm and be extended into a horizontal position.

5. The combination with a crank arm of a folding pedal comprising, a stub spindle having a threaded shank adapted to be mounted in the crank arm and a ball bearing seat, a removable ball bearing mounted on the seat, a ball bearing cage removably mounted on the ball bearing having outwardly bent portions on opposite sides adapted to form flat surfaces, aligning trunnions mounted in said flat surfaces out of line and at right angles to the axis of the bearing, a folding foot piece having side flanges adapted to be pivotally mounted on said trunnions, and fold against the bearing and cage, or will extend in a horizontal position for the reception of the foot of an operator.

6. The combination with a crank arm of a folding pedal comprising, a stub spindle having a threaded shank adapted to be mounted in the crank arm and a ball bearing seat, a ball bearing removably mounted on the seat, a sheet metal cage removably mounted on the ball bearing having outwardly bent portions on opposite sides adapted to form flat surfaces, trunnions mounted in said flat surfaces below the axis of said spindle, a folding foot piece having side flanges pivotally mounted on said trunnions adapted to fold against the end of the spindle and bearing and automatically assume a position to receive the foot of an operator when extended into a horizontal position.

7. The combination with a crank arm of a folding pedal comprising, a spindle mounted in the crank arm, a standard roller bearing removably mounted on the spindle, a sheet metal bearing cage removably mounted on the ball bearing having outwardly bent portions on opposite sides adapted to form flat surfaces, trunnions mounted in said flat surfaces below the axis of said spindle, a sheet metal folding foot piece U-shaped in cross section pivotally mounted on said trunnions below the axis of the bearing and having frictional contact at its inner end with said flat surfaces adapted when folded to inclose the bearing and cage between its flanges.

8. The combination with a crank arm of a folding pedal comprising, a spindle mounted in the crank arm, a ball bearing removably mounted on the spindle, a sheet metal bearing cage removably mounted on the ball bearing having outwardly bent portions on opposite sides of the cage adapted to form flat surfaces and receive trunnions mounted in said flat surfaces below and at right angles to the axis of said spindle, a folding foot piece having side flanges pivotally and frictionally mounted on said trunnions, adapted when extended to swing by gravity on said bearing below the axis of the bearing and automatically cause the foot piece to assume a position to receive the foot of the operator.

9. A folding pedal comprising, a spindle removably mounted in the crank arm, a standard ball bearing removably mounted on the spindle, a sheet metal cage removably mounted on the bearing, a sheet metal folding foot piece having upwardly extending side plates, serrations arranged along the upper edges of the side plates adapted to prevent slipping of the foot on the pedal, said foot piece detachably mounted on the cage below the axis of the bearing adapted when extended to swing by gravity below the axis of said bearing and present said serrations upwardly to receive the foot of an operator, and a washer mounted on the end of the spindle adapted to secure the parts in place.

WILLIAM B. JOHNSON.